United States Patent
Ho

(10) Patent No.: US 6,650,027 B1
(45) Date of Patent: Nov. 18, 2003

(54) EMERGENCY POWER SUPPLY

(75) Inventor: Lien-Hsun Ho, Taipei (TW)

(73) Assignee: Cyber Power System Inc., Taipei (TW)

( * ) Notice: Subject to any disclaimer, the term of this patent is extended or adjusted under 35 U.S.C. 154(b) by 0 days.

(21) Appl. No.: 10/188,991

(22) Filed: Jul. 5, 2002

(51) Int. Cl.[7] .................................................. H02J 7/00
(52) U.S. Cl. ........................................................ 307/66
(58) Field of Search ............................ 307/64, 65, 66, 307/44, 46, 48, 80

(56) References Cited

U.S. PATENT DOCUMENTS

| | | | | |
|---|---|---|---|---|
| 4,475,047 A | * | 10/1984 | Ebert, Jr. ...................... | 307/66 |
| 4,860,185 A | * | 8/1989 | Brewer et al. ................. | 363/41 |
| 6,181,029 B1 | * | 1/2001 | Berglund et al. .............. | 307/66 |

* cited by examiner

*Primary Examiner*—Shawn Riley
(74) *Attorney, Agent, or Firm*—Venable LLP; Fei-Fei Chao

(57) ABSTRACT

An emergency power supply includes a rectifier component for stepping down and rectifies the input AC signals from the primary power line, wherein the rectifier is coupled to a voltage regulator to allow for battery charging, and the stabilizer is further connected through a switch to a system control circuit which controls the power source. The output of the stabilizer is also connected to a DC to DC converter, such that the power source from the primary power line can also supply loads in normal power conditions. In case of power outage, the microprocessor enables the switching element thereby allowing the storage battery to be connected, so that the output current is stepped up and passed to the DC to DC converter for generating load current. The emergency procedures can thus be initiated before the primary power line goes down, avoiding disruption in system operation.

11 Claims, 2 Drawing Sheets

EMERGENCY POWER SUPPLY

BACKGROUND OF THE INVENTION

1. Field of the Invention

The present invention relates to an emergency power supply, in particular to a power supply that provides power conversion in normal power conditions and emergency power in case of power outage.

2. Description of Related Arts

Electrical power is not only the key issue to the fast industrial development, but is also an indispensable power source for households. While AC power is mostly used by industrial users which have their different voltage requirements, DC power is used in sensitive equipment, computers, and small electrical appliances. Normally, AC power supply has to be stepped down and converted to DC before the electrical energy can be used to drive these appliances, or alternatively, battery power can be used. It is known that power supply is needed to operate most computers and electronic equipment, and for most people the experiences of power blackouts or brownouts are not uncommon. These abnormal power conditions often cause disruptive loss of data and system interruption for power users without any warning. For sensitive equipment, that means the operation parameters have to be adjusted or reset besides any loss of important data. Many so-called uninterrupted power supply (UPS) devices or backup batteries for power supply management have been designed to fill these needs. Most devices of this kind act as a buffer in a sudden power break, providing power users with additional time so that they can save their valuable operation data and prepare for normal equipment shutdown. But the designs for most devices are quite complex and their applications are limited.

SUMMARY OF INVENTION

The main object of the present invention is to provide an emergency power supply with simple construction, yet possessing the battery charging/discharging and normal power conversion functions.

The emergency power supply mainly comprises a rectifier component, a stabilizer, a storage battery, a system control circuit, a microprocessor, a DC to DC converter, a voltage booster component, and a pilot light.

The rectifier component is to step down the input voltage and rectify the input AC current from the primary power line; the stabilizer is to provide a constant DC current for battery charging and power conversion; the system control circuit under the control of a microprocessor is to initiate the system control functions; the microprocessor through the output of the rectifier component is to detect any breakage in the primary power supply; the voltage booster component is used to step up the output voltage from the storage battery before passing on to the DC to DC converter; and the DC to DC converter is used to output load current.

In a normal operation cycle, an AC power input having been stepped down is used to charge the storage battery at a constant voltage, and it can also supply the output load current through the DC to DC converter. In case of power outage, the microprocessor detects the abnormal power condition from the rectifier output and enables the switching element to allow current output from the storage battery which is stepped up and passed to the DC to DC converter for supplying the operating loads, such that all emergency initiation procedures are completed before the primary power line is down.

The emergency power supply also includes a temperature sensing circuit for monitoring the operating temperature of the control system and the measured data are output to the microprocessor for system analysis.

The emergency power supply also includes a pilot light formed by two transistors respectively connected to two light emitting diodes of different colors for distinguishing the power status between the primary power and the battery power.

The features and structure of the present invention will be more clearly understood when taken in conjunction with the accompanying figures.

DFTAILED DESCRIPTION OF THE PREFERRED EMBODIMENT

Figure 1A:
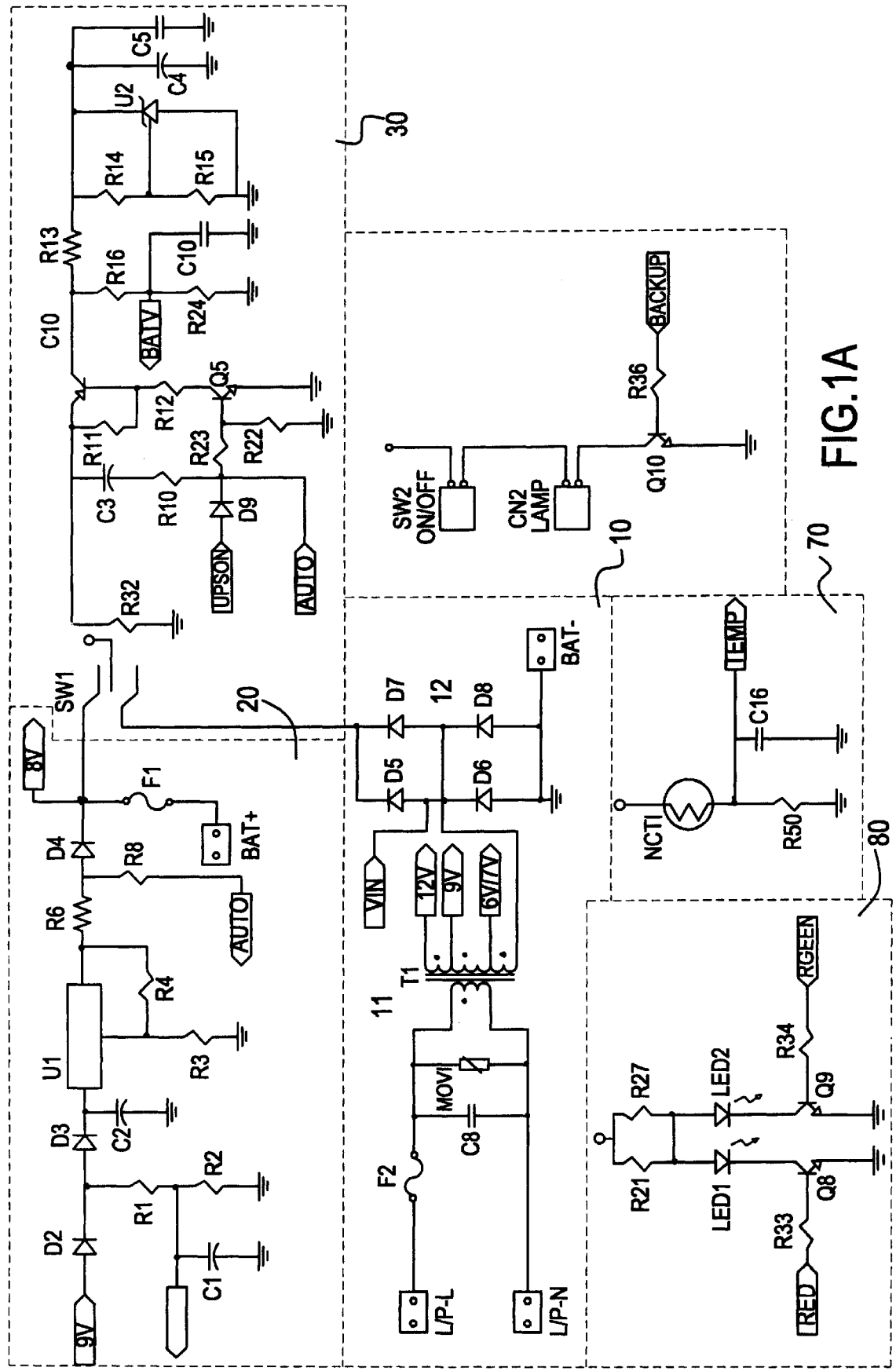
FIGS. 1A and 1B showa schematic circuit diagram of the present invention.
Figure 1B:
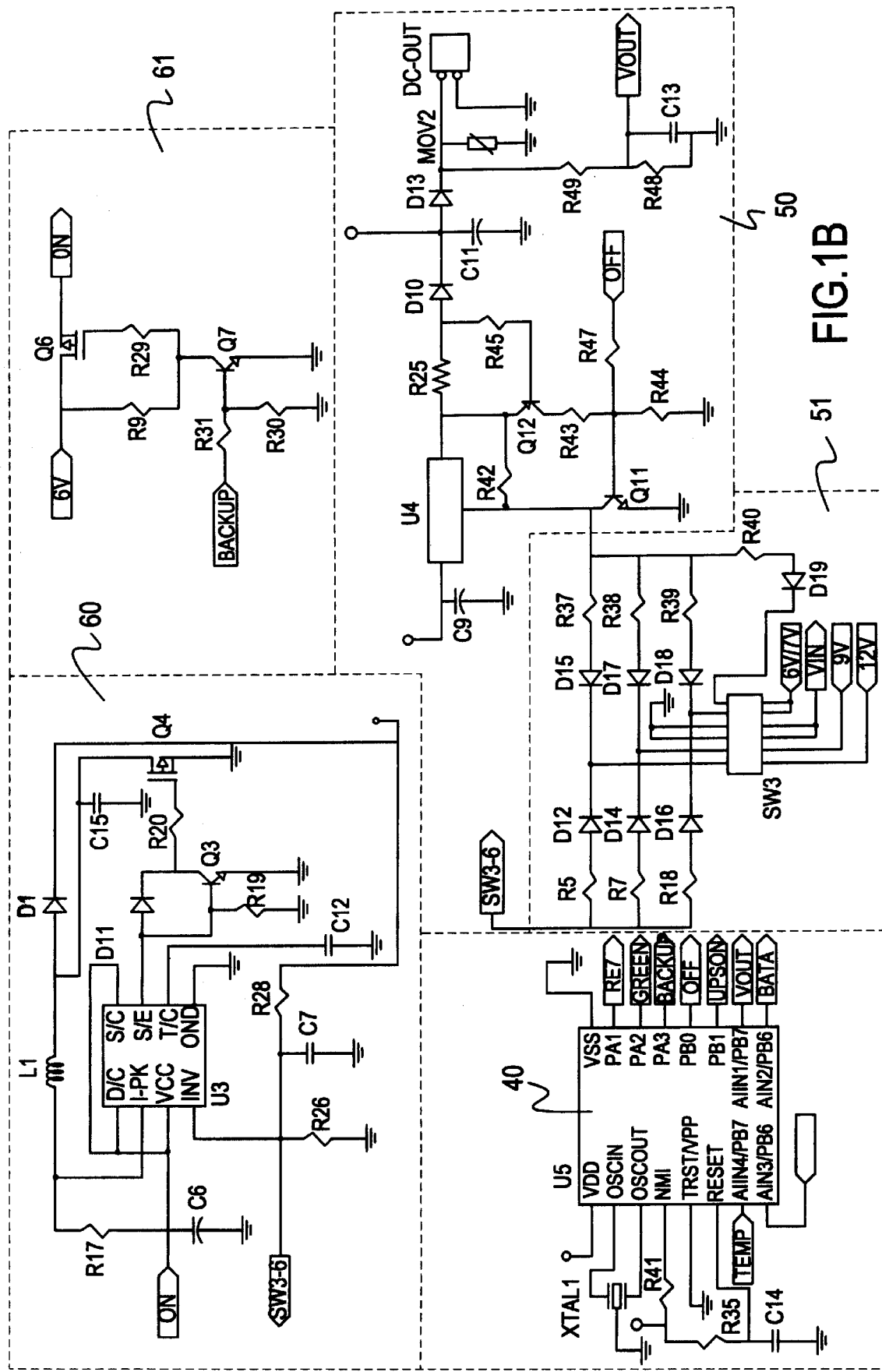

With reference to FIGS. 1A and 1B, the emergency power supply comprises a rectifier component (10), a stabilizer (20), a storage battery (21), a system control circuit (30), a microprocessor (40), a DC to DC converter (50), a voltage booster component (60), a temperature sensing circuit (70) and a pilot light (80).

The rectifier component (10) formed by a voltage transformer (11) and a bridge rectifier (12) is used to step down and rectify the AC input signals from the primary power line.

The stabilizer (20)formed by two rectifying diodes (D1 and D2) and a voltage regulator (U1) is to provide a constant DC power, wherein the input is connected to the low voltage output terminal from the transformer (11) (output voltage is 9V in the current example) of the rectifier component (10).

The storage battery (21) is connected to the output from the stabilizer (20) for battery charging, and also through a first switch (31) to the system control circuit (30).

The system control circuit (30) is used to detect the resumption of normal power on the primary power line after a power outage and control the power conversion in normal power conditions, wherein an auto initiation terminal is connected to the output of the voltage regulator (U1) of the stabilizer (20) through the first switch (31), where the first switch (31) is manually operated. When it is ON, the system control circuit (30) is then activated for normal power conversion or emergency power supply.

The microprocessor (40) through a line detection terminal (LINE) is coupled to the input of the stabilizer (20) to monitor the output voltage from the transformer (11) to determine whether the primary power line is in normal condition, and its system control terminals (UPSON, BATV) are connected to respective terminals of the system control circuit (30) for initiating the system control functions during normal power supply and battery power supply.

The DC to DC converter (50) is formed by a voltage regulator (U4) and a voltage level selector (51), wherein the voltage level selector (51) is formed by a manual operated second switch (51) and multiple diodes. The voltage level selector (51) is connected to the reference voltage terminal of the voltage regulator (U4) for selecting the output voltage of the voltage regulator (U4), and a transistor (Q11) is installed between the reference voltage terminal and the grounding terminal of the voltage regulator (U4), such that the breakover of the transistor (Q11) can be controlled by the microprocessor (40) through an OFF pin. As the transistor (Q11) is turned on, the reference voltage terminal of transformer U4 is switchedto ground level, so that the DC to DC converter (50) is not activated.

The control terminal ON of the voltage booster component (60) is connected to the power output terminal (6V) of the storage battery (21) through a switching element (61), and the output is connected to the input power terminal (16V) of the DC to DC converter (50) for stepping up the current voltage from the storage battery (21). The switching element (61) is formed by a first transistor (Q6) and a second transistors (Q7); wherein the first transistor (Q6) is used to control the 6V power output from the storage battery (21) to the control terminal of the voltage booster component (60), and the second transistor (Q7) under the control of the microprocessor (40) is to control the breakover of the first transistor (Q6).

The temperature sensing circuit (70) is formed by a thermal resistor (NCT1), and multiple regular resistors and capacitors, and is used to monitor the system operation temperature and then pass the measured data to the temperature detecting pin (TEMP) of the microprocessor (40).

A pilot light (80) is formed by two transistors (Q8, Q9) which are respectively connected to two light emitting diodes (LED1, LED2) of red and green colors (in the current example), such that the RED and GREEN pins of the microprocessor (40) can control the turning on of the respective LEDs to indicate the current power status between the primary power supply and battery power supply.

In normal operation cycle, AC power input having been stepped down through the rectifier component (10) and through the stabilizer (20) can be used to charge the storage battery (21). At the same time, the microprocessor (40) monitors the primary power line and outputs signals through the system control circuit (30) to initiate the system control functions, such that the output current from the stabilizer (20) is passed on to the DC to DC converter (50) for power conversion to output load current.

In case of power outage, the microprocessor (40) detects the abnormal power situation from the output from the rectifier component (10), and thereby disables the system control circuit (30) and turns on the switch element (61) allowing the storage battery (21) to be connected. After passing through the booster component (60) and the DC to DC converter (50), output load current is generated from the battery (21) replacing the primary power line. All emergency procedures of the control system are completed before the primary power goes down.

From the foregoing, the present invention can be used to convert AC power to DC and output load current in normal operating conditions, that is the basic capabilities of an ordinary power supply. It also possess the capabilities to charge/discharge a storage battery for emergency power supply in case of a power outage, allowing power users sufficient time to prepare the necessary shut down procedures and save important data to avoid disruptive loss of data or system damage.

The foregoing description of the preferred embodiments of the present invention is intended to be illustrative only and, under no circumstances, should the scope of the present invention be so restricted.

What is claimed is:

1. An emergency power supply, comprising: a rectifier component, a stabilizer, a storage battery, a system control circuit, a microprocessor, a DC to DC converter, and a voltage booster component; wherein the rectifier component for stepping down and rectifying input AC signals;

the stabilizer being connected between the rectifier component and the system control circuit for generating DC current at a constant voltage;

the storage battery being connected to the output from the rectifier component for battery charging;

the system control circuit being connected to the output of the stabilizer through a switching element for initiating system control functions;

the microprocessor for monitoring the status on the primary power line, and through the system control circuit for initiating the system control functions;

the voltage booster component being connected through a switching element to the storage battery for stepping up the current voltage from the battery before outputting load current; and the DC to DC converter for outputting DC current to supply the operating loads.

2. The emergency power supply as claimed in claim 1, wherein the temperature detect terminal of the microprocessor is coupled with a temperature sensing circuit for monitoring the system operating temperature.

3. The emergency power supply as claimed in claim 2, wherein the temperature sensing circuit is formed from a thermal resistor, and multiple regular resistors and capacitors.

4. The emergency power supply as claimed in claim 1, wherein one output terminal of the microprocessor is connected to the pilot light for indicating the system operation conditions.

5. The emergency power supply as claimed in claim 4, wherein the pilot light is controlled by two transistors respectively connected to light emitting diodes of different colors.

6. The emergency power supply as claimed in claim 1, wherein the rectifier component is formed by a transformer and a bridge rectifier.

7. The emergency power supply as claimed in claim 1, wherein the stabilizer is formed by multiple current rectifying diodes and a stabilizer.

8. The emergency power supply as claimed in claim 6, wherein the stabilizer is formed by multiple current rectifying diodes and a voltage regulator.

9. The emergency power supply as claimed in claim 1, wherein the switching element is formed by a first transistor and a second transistor, wherein the first transistor is used to control the output current from the battery to the control terminal of the stabilizer, and the second transistor is used to control breakover of the first transistor.

10. The emergency power supply as claimed in claim 1, wherein the DC to DC converter is formed by a voltage regulator and a voltage level selector, and the voltage level selector is connected to the reference voltage terminal of the stabilizer for adjusting the output voltage level of the voltage regulator.

11. The emergency power supply as claimed in claim 10, wherein the voltage level selector is formed by multiple diodes and a manual operated switch.

* * * * *